Nov. 8, 1966  J. L. MOSSEY ET AL  3,283,858
BRAKE
Filed Jan. 7, 1965  2 Sheets-Sheet 1
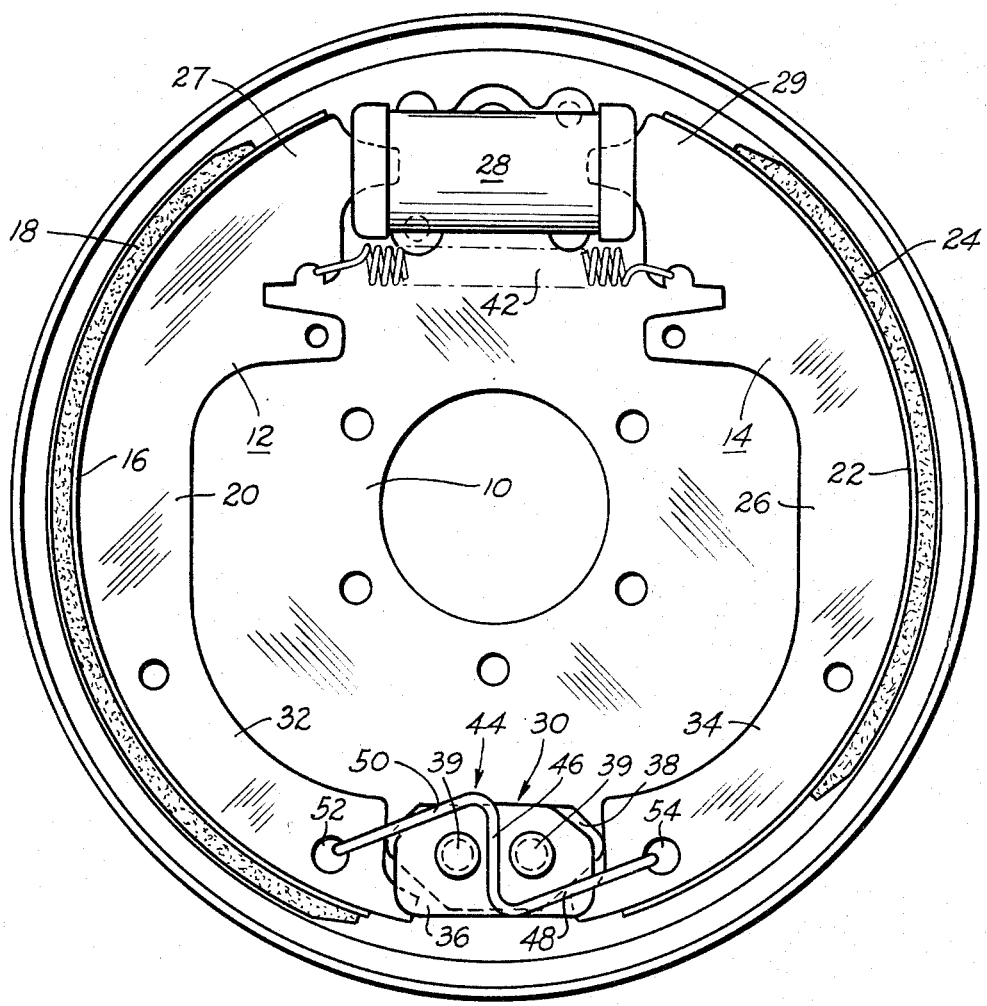
FIG_1
JOSEPH L. MOSSEY.
RICHARD T. BURNETT.
INVENTORS
BY
Sheldon F. Raizes
ATTORNEY

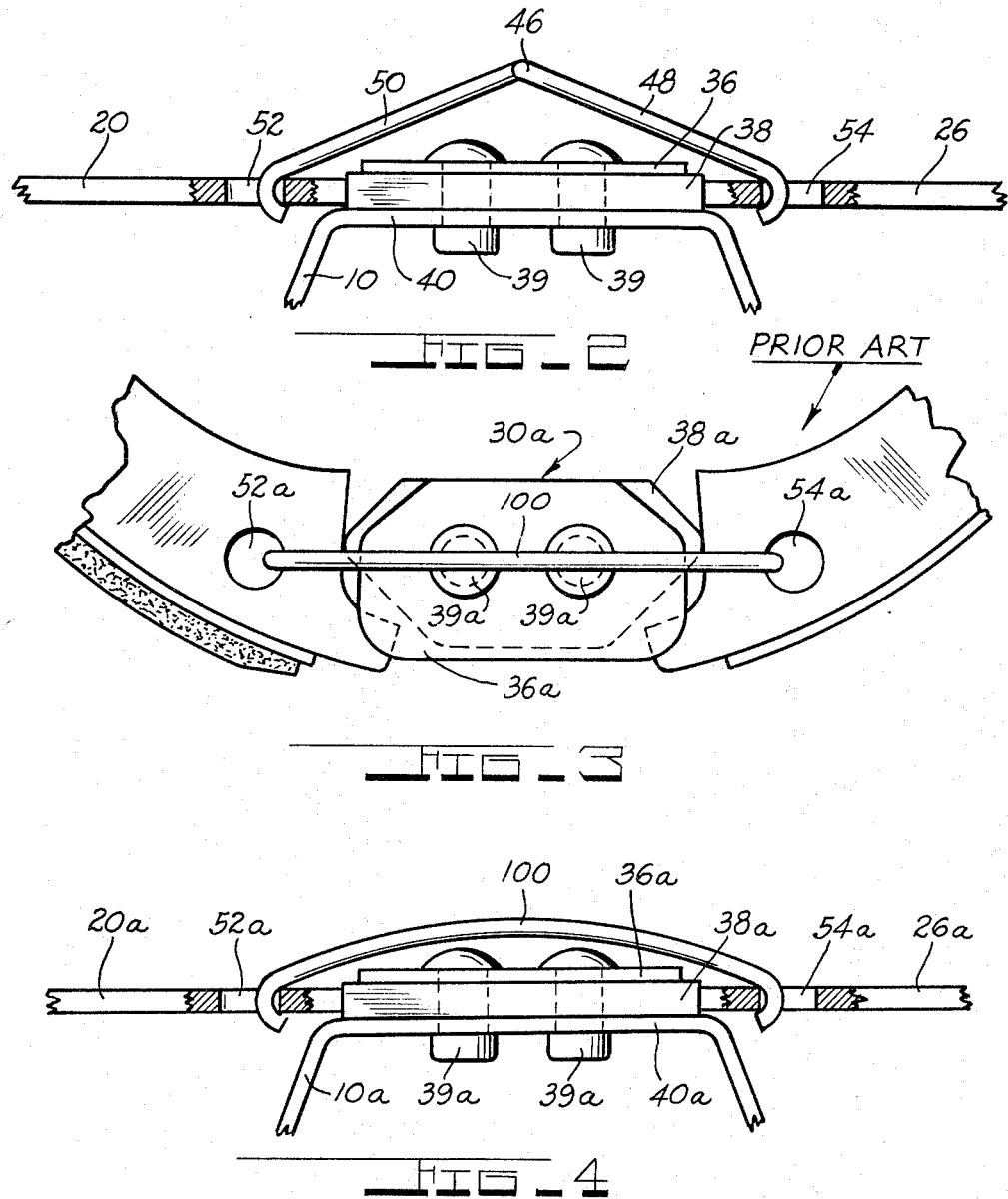

United States Patent Office 3,283,858
Patented Nov. 8, 1966

3,283,858
BRAKE
Joseph L. Mossey and Richard T. Burnett, South Bend, Ind., assignors to The Bendix Corporation, South Bend, Ind., a corporation of Delaware
Filed Jan. 7, 1965, Ser. No. 423,904
4 Claims. (Cl. 188—78)

This invention concerns a non-servo brake.

More particularly, this invention relates to a torsion spring for holding a pair of brake shoes in engagement with an anchor.

An object of this invention is to provide a non-servo brake with a spring for holding a pair of brake shoes in engagement with an anchor which is easy to assemble and of such resiliency that it is capable of effecting a designed load with minimum variation in load while accommodating tolerance variations in the spring and associated pieces.

Other objects and advantages will become apparent to those skilled in the art from the following description with reference to the drawing wherein:

FIGURE 1 is a front elevational view of a brake assembly;

FIGURE 2 is a bottom view of a torsion spring utilized in the brake assembly;

FIGURE 3 is a partial front elevational view of a brake assembly illustrating a spring arrangement of prior art; and FIGURE 4 is a bottom view of FIGURE 3.

Referring to FIGURE 1, there is illustrated a brake assembly which comprises a backing plate 10 on which two arcuate brake shoes 12 and 14 are slidably mounted in end-to-end relationship. The brake shoe 12 comprises an arcuate rim 16, having friction material 18 secured to the outer face thereof and a transverse web 20 secured to the inner face thereof. The brake shoe 14 comprises an arcuate rim 22 having friction material 24 secured to the outer face thereof and a transverse web 26 secured to the inner face thereof. A wheel cylinder 28 is located between and has a pair of actuating pistons abutting a respective one of a pair of adjacent brake shoe ends 27, 29 for spreading the brake shoes upon introducing actuating pressure into the wheel cylinder. A shoe-to-shoe return spring 42 interconnects the shoes to return the same to related position upon release of fluid actuating pressure in the wheel cylinder. A stationary anchor assembly 30 is located between the other pair of adjacent brake shoe ends 32 and 34 for engagement thereby. The anchor assembly comprises a shoe guide plate 36 and an anchor block 38 which are secured to a raised portion 40 of the backing plate 10 by a pair of rivets 39. A generally Z-shaped wire torsion spring 44 interconnects the ends 32 and 34 of the brake shoes to maintain the same in engagement with the anchor block 38. The torsion spring comprises a straight main body portion 46 axially spaced from the anchor block assembly and a pair of legs 48, 50 each extending in opposite directions from a respective end of the main body 46 toward the backing plate in a plane which is inclined to the plane in which the main body portion lies. The free end of each leg is bent to hook onto the edge of a respective opening 52 and 54 of the shoe webs 20 and 26. Each of the legs 50 extends laterally away from the main body 46 at an angle which is acute therewith. The main body portion 46 is in torsion and the arms 48 and 50 exert a load on the shoes which is substantially at the web centerline.

FIGURES 3 and 4 illustrate a typical prior art C-spring 100 utilized for holding a pair of shoe ends in engagement with an anchor. The anchor block assembly, the brake shoes and the backing plate are designated with the same reference numerals as in previous figures, only with an "a" affixed thereto. The spring 100 has a pair of bent ends hooking onto a respective edge of the openings 52a and 54a of the brake shoes. This type of spring is inherently stiffer in construction than the torsion spring described above.

If a designed mean load is for 30 pounds, then the spring rate of this type of spring must be approximately 400 pounds per inch. A small variation in distance between the holes 52a and 54a will cause a wide variation in the installed load of the spring and the tolerance experienced in the forming of the spring will also cause a wide variation of load. These variations can cause as much as .080" variation in the extension of the spring when installed and the installed load could vary between a range of approximately 14 to 46 pounds or a total of 32 pounds differential. In the torsion type spring, a rate of 125 pounds per inch will result in a mean design load of 30 pounds and the installed load will vary between a range of approximately 25 to 35 pounds or a total of a 10 pound differential.

Also, due to its low spring rate, the torsion type spring is easier to assemble since an additional deflection must be produced to let the spring hook into the holes.

From the above, it can be seen that the aforementioned objects have been achieved.

We claim:

1. In a drum brake assembly comprising: a drum rotatable about a central axis, a support member, a pair of brake shoes slidably mounted on said support member in end-to-end relationship, actuating means disposed between one pair of adjacent shoe ends, stationary anchoring means fixedly secured to said support member and disposed between the other pair of adjacent shoe ends, an integral one-piece spring having a central portion axially spaced from said anchoring means and a pair of legs at each end thereof extending laterally away therefrom in opposite directions and at an incline to the plane of said central portion with the free ends of each leg being operatively connected to a respective one of said other pair of adjacent shoe ends for urging said shoe ends into engagement with said anchoring means, said legs and central portion being so arranged relative to each other that said central portion is in torsion.

2. In a brake assembly comprising: a drum rotatable about a central axis, a support member, a pair of brake shoes slidably mounted on said support member in end-to-end relationship for engagement with said drum, actuating means disposed between one pair of adjacent shoe ends, stationary anchoring means fixedly secured to said support member and disposed between the other pair of adjacent shoe ends, an integral one-piece torsion spring having a central portion lying in a plane generally perpendicular to said axis and axially spaced from said anchoring means and a pair of legs at each end thereof extending laterally away therefrom in opposite directions and at an incline to the plane of said central portion with the free ends of each leg being operatively connected thereto for urging said shoe ends into engagement with said anchoring means.

3. In a brake assembly as recited in claim 2 wherein each of said legs are generally straight and extend laterally away from said central portion at an angle which is acute.

4. In a brake assembly as recited in claim 2 wherein said central portion is generally straight and each of said legs are generally straight and extend laterally away from said central portion at an angle which is acute, whereby said torsion spring is Z-shaped.

No references cited.

DUANE A. REGER, *Primary Examiner.*